United States Patent
Du et al.

(10) Patent No.: US 9,330,483 B2
(45) Date of Patent: May 3, 2016

(54) AVATAR FACIAL EXPRESSION TECHNIQUES

(75) Inventors: Yangzhou Du, Beijing (CN); Xiaofeng Tong, Beijing (CN); Wei Hu, Beijing (CN); Yimin Zhang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 49 days.

(21) Appl. No.: 13/977,682

(22) PCT Filed: Apr. 11, 2011

(86) PCT No.: PCT/CN2011/072603
§ 371 (c)(1),
(2), (4) Date: Sep. 30, 2013

(87) PCT Pub. No.: WO2012/139276
PCT Pub. Date: Oct. 18, 2012

(65) Prior Publication Data
US 2014/0035934 A1   Feb. 6, 2014

(51) Int. Cl.
G06T 13/00  (2011.01)
G06T 13/40  (2011.01)
G06T 13/80  (2011.01)
G06T 17/20  (2006.01)

(52) U.S. Cl.
CPC ............... *G06T 13/40* (2013.01); *G06T 13/80* (2013.01); *G06T 17/20* (2013.01)

(58) Field of Classification Search
CPC ...... G06T 13/40; G06T 13/80; G06T 2200/08
USPC ...................................................... 345/474
See application file for complete search history.

(56) References Cited

U.S. PATENT DOCUMENTS 6,072,496 A    6/2000   Guenter et al.
(Continued)

FOREIGN PATENT DOCUMENTS

| CN | 1920886 | 2/2007 |
|---|---|---|
| CN | 10182627 | 9/2010 |
| TW | 200943197 | 10/2009 |
| TW | 200947316 | 11/2009 |
| TW | 2010/28934 | 8/2010 |
| WO | WO 2009/128784 | 10/2009 |

OTHER PUBLICATIONS

Taiwan Office Action and Search Report Translation, Taiwan Application No. 101112310 Issued Nov. 26, 2014; 7 pages.
(Continued)

*Primary Examiner* — Peter Hoang
(74) *Attorney, Agent, or Firm* — Blakely, Sokoloff, Taylor & Zafman LLP

(57) ABSTRACT

A method and apparatus for capturing and representing 3D wireframe, color and shading of facial expressions are provided, wherein the method includes the following steps: storing a plurality of feature data sequences, each of the feature data sequences corresponding to one of the plurality of facial expressions; and retrieving one of the feature data sequences based on user facial feature data; and mapping the retrieved feature data sequence to an avatar face. The method may advantageously provide improvements in execution speed and communications bandwidth.

20 Claims, 7 Drawing Sheets

(56) References Cited

U.S. PATENT DOCUMENTS

| | | | |
|---|---|---|---|
| 6,504,546 B1 * | 1/2003 | Cosatto | G06T 13/40 345/473 |
| 2008/0136814 A1 | 6/2008 | Chu | |
| 2008/0170777 A1 | 7/2008 | Sullivan | |
| 2008/0201144 A1 | 8/2008 | Song et al. | |
| 2011/0091071 A1 * | 4/2011 | Sabe et al. | 382/103 |

OTHER PUBLICATIONS

PCT Search Report, PCT/CN2011/072603, Intel Corporation, Oct. 27, 2011, 14 pages.

TW Application No. 101112310 Office Action and Taiwan IPO Search Report issued Jul. 30, 2015, 10 pages.

\* cited by examiner

|     |           |              |
|-----|-----------|--------------|
| (1) | 16.560 ... | 64.555 82.804 |
| (2) | 17.184 ... | 64.504 83.111 |
| (3) | 18.137 ... | 64.403 83.149 |
| (4) | 18.680 ... | 64.427 83.106 |
| (5) | 19.819 ... | 64.533 83.032 |
| (6) | 20.094 ... | 64.555 82.870 |
| (7) | 21.084 ... | 64.136 82.793 |
| (8) | 22.298 ... | 64.127 82.731 |
| (9) | 23.192 ... | 64.127 82.796 |
| (10)| 24.179 ... | 64.077 82.690 |
| (11)| 26.601 ... | 63.630 82.560 |

(a)

|     |           |              |
|-----|-----------|--------------|
|     | 25.579 ... | 64.127 82.731 |
|     | 24.135 ... | 64.555 82.804 |
|     | 23.152 ... | 64.403 83.149 |
|     | 22.238 ... | 64.427 83.106 |
|     | 21.114 ... | 64.589 82.722 |
|     | 20.134 ... | 64.023 82.634 |
|     | 19.619 ... | 64.124 82.891 |
|     | 18.673 ... | 64.056 82.032 |
|     | 18.101 ... | 64.562 82.233 |
|     | 17.217 ... | 64.011 82.471 |
|     | 16.500 ... | 64.912 82.472 |

(b)

Two example facial feature sequences in the database

FIG. 7

| (1) | 17.254 ... | 64.324 82.267 |
|-----|-----------|--------------|
| (2) | 18.674 ... | 64.034 82.056 |
| (3) | 20.135 ... | 64.057 82.687 |

An input facial feature sequence

AVATAR FACIAL EXPRESSION TECHNIQUES

CROSS-REFERENCE TO RELATED APPLICATION

This patent application is a U.S. National Phase Application under 35 U.S.C. §371 of International Application No. PCT/CN2011/072603, filed Apr. 11, 2011, entitled "AVATAR FACIAL EXPRESSION TECHNIQUES".

BACKGROUND

Avatars are widely used in various systems and applications, such as computer games, user interface applications, and telecommunications (e.g., in FaceTime provided by Apple iPhone 4, and in Avatar Kinect provided by Microsoft Xbox 360).

For instance, an avatar (e.g., a real face, a cartoon face, an animal face, etc.) simulates a user's facial expressions and head movements. Not only does this provide an interesting user experience, this can protect the user's privacy when the user does not want to reveal his or her real face.

Additionally, using an avatar to replace a real face can save considerable communications bandwidth. This allows for the efficient execution of collaborative applications (e.g., video conferencing, virtual classrooms, etc.).

There are three general problems associated with facial expression driven avatar applications. First, it is hard for a camera to accurately capture and track changes in a human's facial expressions when varying illumination conditions and head movements exist. Second, camera-based face tracking can only reliably track a limited number of facial features (e.g., 10 points such as mouth corners, eye corners, and so forth). Such a limited number may be inadequate to directly wholly drive avatar facial expression animations. Third, to describe real facial expression changes need a lot of communication bandwidth, which is a barrier for applications like video conference or avatar based communications.

BRIEF DESCRIPTION OF THE DRAWINGS

In the drawings, like reference numbers generally indicate identical, functionally similar, and/or structurally similar elements. The drawing in which an element first appears is indicated by the leftmost digit(s) in the reference number. Embodiments will be described with reference to the accompanying drawings, wherein:

FIG. 7 are two exemplary database facial feature sequences;
FIG. 8 is an exemplary input facial feature sequence.

DETAILED DESCRIPTION

Embodiments provide techniques that can efficiently solve the problems described above. As a result, a practical, real time (or super real time), online and low communication bandwidth avatar system may be implemented. Such a system may reliably simulate a user's facial expression changes and head movements. Moreover, such a system may be achieved through the employment of only a normal web camera and a computing device.

Additionally, embodiments may provide new fast and robust face tracking algorithms. Also, embodiments may provide new facial expression sequence retrieval approaches. Further, embodiments may provide new fast facial animation simulation approaches.

Embodiments may provide various advantages. One such advantage is the ability to provide avatar-based systems and applications that may operate using lower bandwidth communications For example, as described below, in each frame (e.g., video frame), only a few facial features (e.g., nine features) need to be transferred to a remote side to drive a remote avatar's facial animation. As an example, in an avatar-based video chatting application, if want to show an avatar facial animation in remote end, only 9*4*30=1080 bytes a second need to be transferred (assuming 30 frames/second communication rate). Also, the transformation can be further reduced if facial changes do not need to transferred during every frame.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Operations for the embodiments may be further described with reference to the following figures and accompanying examples. Some of the figures may include a logic flow. Although such figures presented herein may include a particular logic flow, it can be appreciated that the logic flow merely provides an example of how the general functionality described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited to this context.

Figure 1:
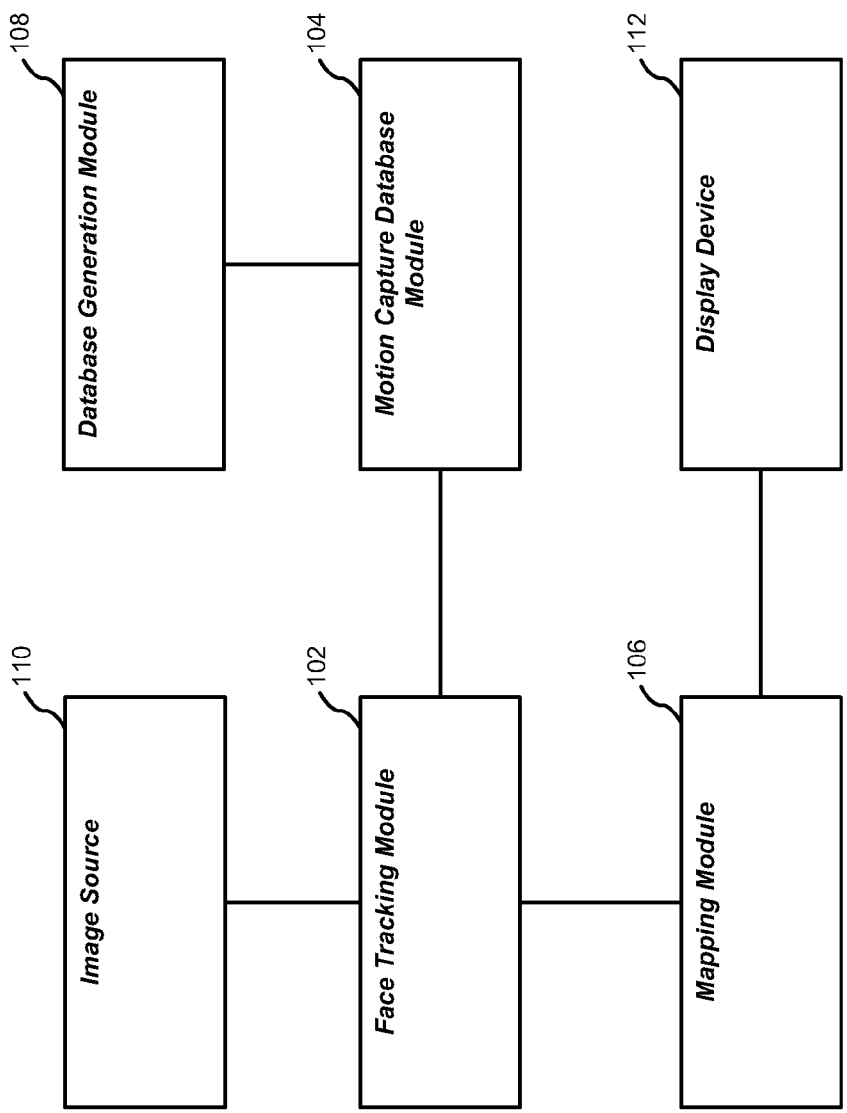
FIG. 1 is a diagram of an exemplary implementation.

FIG. 1 is a block diagram of an exemplary implementation 100. This implementation may be employed to provide an avatar that simulates a user's movements and expressions. As shown in FIG. 1, implementation 100 may include a face tracking module 102, a motion capture database module 104, a mapping module 106, a database generation module 108, an image source 110, and a display device 112. These elements may be implemented in any combination of hardware and/or software Face tracking module 102 receives image data, such as one or more video frames. This data may be received from image source 110. From this data, face tracking module 102 may detect faces and determine features of these faces. Such features may include positions of feature points. Then, these positions (and/or their movements) may be used to determine two components: facial expression movements and head rigid movements. In embodiments, such facial expression movements may be represented as multiple features (e.g., nine features, as described below). In addition, based on such features, face tracking module 102 may retrieve most similar expression features from motion capture database 104.

Motion capture database 104 records (or stores) data for a human's different facial expressions (e.g., smile, laugh, anger, surprise, speak, eat, etc.). These expressions may be recorded as sequences of frames. Each such frame may include multiple features, such as the nine features described herein. Accordingly, motion capture database 104 may include an information storage medium, such as memory (volatile or non-volatile), disk storage, optical storage, etc.

Based on features retrieved from motion capture database 104, mapping module 106 controls the avatar. This may involve normalizing and remapping the human face to the avatar face, copying the facial expression changes to the avatar, and then driving the avatar to perform the same facial expression changes as in the retrieved features. In embodiments, mapping module 106 may include graphics rendering features that allow the avatar to be output by display device 112.

Thus, display device 112 may visually output the avatar to a user. Display device may be implemented with various display(s). Exemplary displays include (but are not limited to) liquid crystal displays (LCDs), light emitting diode (LED) displays, plasma displays, and cathode ray tube (CRT) displays.

In embodiments, face tracking module 102 may receive image data from image source 110. Such image data may be in the form of a sequence of images or frames (e.g., video frames). Image source 110 may include an image sensing device, such as a camera. Such a device may include various components. Exemplary components include (but are not limited to) an optics assembly, an image sensor, and an image/video encoder. These components may be implemented in any combination of hardware and/or software.

The optics assembly may include one or more optical devices (e.g., lenses, mirrors, etc.) to project an image within a field of view onto multiple sensor elements within the image sensor. In addition, the optics assembly may include mechanism(s) to control the arrangement of these optical device(s). For example, such mechanisms may control focusing operations, aperture settings, exposure settings, zooming operations, shutter speed, effective focal length, etc. Embodiments, however, are not limited to these examples.

The image sensor may include an array of sensor elements (not shown). These elements may be complementary metal oxide semiconductor (CMOS) sensors, charge coupled devices (CCDs), or other suitable sensor element types. These elements may generate analog intensity signals (e.g., voltages), which correspond to light incident upon the sensor. In addition, the image sensor may also include analog-to-digital converter(s) ADC(s) that convert the analog intensity signals into digitally encoded intensity values. Embodiments, however, are not limited to these examples.

Thus, the image sensor converts light received through optics assembly into pixel values. Each of these pixel values represents a particular light intensity at the corresponding sensor element. Although these pixel values have been described as digital, they may alternatively be analog. As described above, the image sensing device may include an image/video encoder to encode and/or compress pixel values. Various techniques, standards, and/or formats (e.g., MPEG, JPEG, etc.) may be employed for this encoding and/or compression.

As described above, motion capture database module 104 may store data for a human's different facial expressions. See, e.g., Jin-xiang Chai, Jing Xiao, and Jessica Hodgins, *Vision-based Control of 3D Facial Animation*, Eurographics/SIGGRAPH Symposium on Computer Animation (2003). Such data may be generated by database generation module 108. In embodiments, database generation module 108 generates this data in an offline procedure.

Figure 2:
FIG. 2 is a view of facial markers.

For instance, professional motion capture device(s) (such as products from Vicon Motion Systems, of Oxford, UK) may be used to capture human facial expressions. To do this, a human's face may be affixed (e.g., glued) with markers (e.g., 30-100 markers), as illustrated in FIG. 2. Then, the motion capture device captures three-dimensional (3D) coordinates of each marker in each frame when the human performs different expressions. These coordinates may be recorded for various expressions. Exemplary expressions include (but are not limited to) six types of basic expression (laugh, anger, surprise, sadness, fear, disgust), as well as and some usual expressions like speak and eat. Each of these expressions may be repeated a few times. This may result in about 10 minutes of expression data being recorded.

After the motion capture database is recorded, database generation module 108 may preprocess the database by extraction of the facial features for each frame of the database. More particularly, for each frame in the database, database generation module 108 may compute multiple facial features. In turn, database generation module 108 stores these features in motion capture database module 104.

In embodiments, these multiple facial features may be the following nine features:
1. distance between upper and lower lips;
2. distance between two mouth corners;
3. distance between upper lip and nose tip;
4. distance between lower lip and nose tip;
5. distance between nose-wing and nose tip;
6. distance between upper and lower eyelids;
7. distance between eyebrow tip and nose-tip;
8. distance between two eyebrow tips; and
9. distance between eyebrow tip and eyebrow middle.

However, embodiments may use any number of features. Further, in embodiments, both the motion capture of facial expressions and the preprocessing to extract the facial features are performed offline. Moreover, such operations may be performed infrequently (e.g., only once when developing the implementation 100). Thus, users of implementation 100 do not typically need to care about these operations.

The elements of FIG. 1 may be allocated among one or more devices. For example, in embodiments, face tracking module 102, motion capture database module 104, database generation module 108, and image source 110 may be included in a first device. In turn, mapping module 106 and display device 112 may be in a second device.

Such an arrangement may be provided for a communications application in which the first device generates determines expression features (e.g., as retrieved from database module 104). In turn, these features may be communicated to the second device across any suitable communications media (e.g., wired and/or wireless networks/interfaces). In turn, the second device may drive and render the avatar (e.g., with mapping module 106) for output by display device 112. This allocation is provided for purposes of illustration and not limitation. Accordingly, other allocations may be employed.

In embodiments, these one or more devices may be of various types. Examples of device types include (but are not limited to) cameras, personal digital assistants (PDAs), mobile phones, smartphones, personal computing devices (e.g., desktop devices, laptop devices, tablet devices, etc.), smart televisions, servers, wearable devices, media players, any smart devices, and so forth. Further examples include microprocessors, graphics processors or engines, microcontrollers, application specific integrated circuits (ASICs), and so forth. Embodiments, however, are not limited to these examples.

Figure 3:
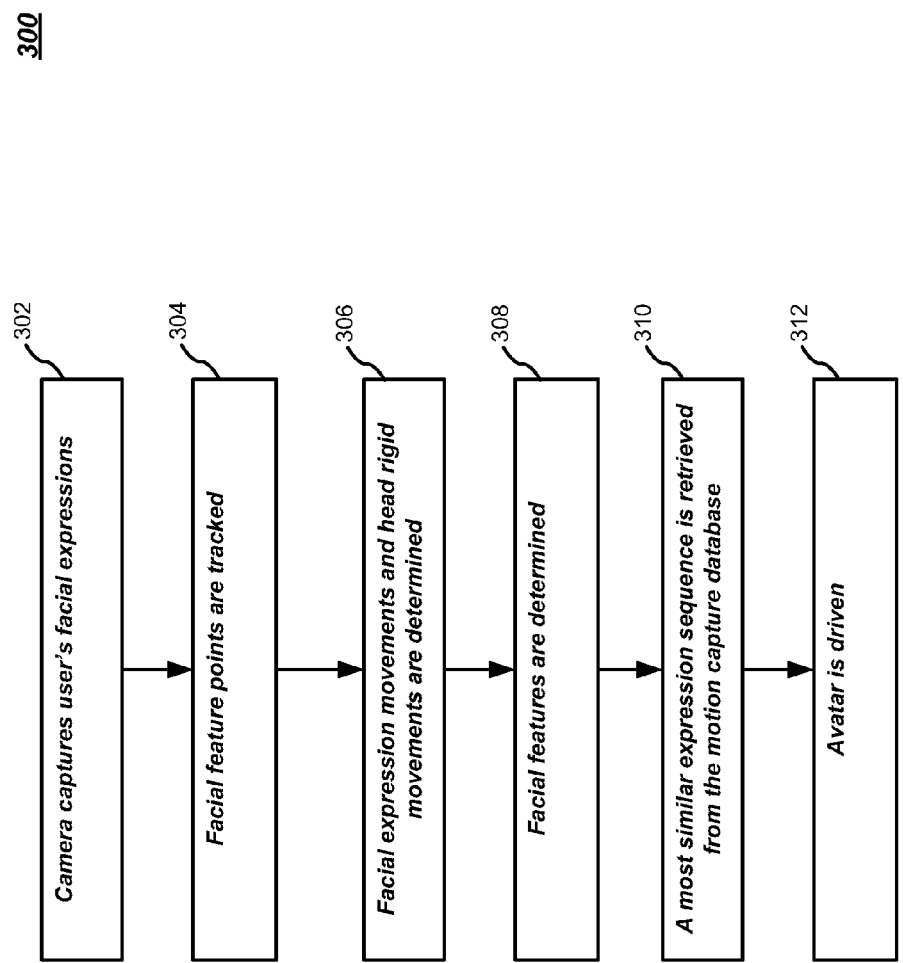
FIGS. 3 and 4 are logic flow diagrams.

FIG. 3 illustrates an exemplary logic flow 300, which shows exemplary operations of an avatar-based facial animation implementation. Such operations may be performed by elements of FIG. 1. However, embodiments are not limited to this context. Also, although FIG. 3 shows particular sequences, other sequences may be employed. Moreover, the depicted operations may be performed in various parallel and/or sequential combinations.

At a block 302, a camera captures a user's facial expressions and head movements.

At a block 304, a face tracking module is employed to track face feature points' positions.

From this, at a block 306, the movement of these feature points is decomposed into two parts: the facial expression movements, and head rigid movements. From this, multiple facial expression data (called "facial features") are determined at a block 308. As described above, nine facial features may be determined for each frame.

At a block 310, the facial features are fed into the motion capture database, and a most similar facial expression sequence is retrieved from the database. This retrieval provides a sequence that resembles the user's facial expression.

In turn, a block 312 is performed. At this block, the human face is normalized and remapped to the avatar face. Also, at this block, the facial expression changes are copied to the avatar.

Then, at a block 314, the avatar is driven. This involve perform the same facial expression changes for the avatar as in the retrieval sequence. Also, in driving the avatar, the head rigid movements will be directly used.

Face tracking features are now described in further detail. In the context of FIG. 1, such features may be provided by face tracking module 102. Embodiments, however, are not limited to this context. In an avatar-based system (e.g., a video chatting system), it is important to capture a user's head gestures, as well as the user's facial expressions. In embodiments, these operations may be performed by a face tracking module. In turn, these gestures and expressions may be expressed as animation parameters. Such animation parameters are transferred to a graphics rendering engine. In this way, the avatar system will be able to reproduce the original user's facial expression on a virtual 3D model.

The performance and the accuracy of the face tracking module largely affects the overall quality of avatar-based animation system. In embodiments, a practical solution for a face tracking module may provide various features. For instance, a face tracking module may track rigid movement due to head gestures. Such rigid movement may include (but is not limited to) translation, rotation and scaling factors. Also, a face tracking module may track non-rigid transformation due to facial expressions. The non-rigid transformations may include multiple facial action units (e.g., six typical facial action units). Further, a face tracking module may be optimized in its implementation to run in real-time on one or more processors (e.g., on Intel Atom 1.6 GHz processors).

Figure 4:
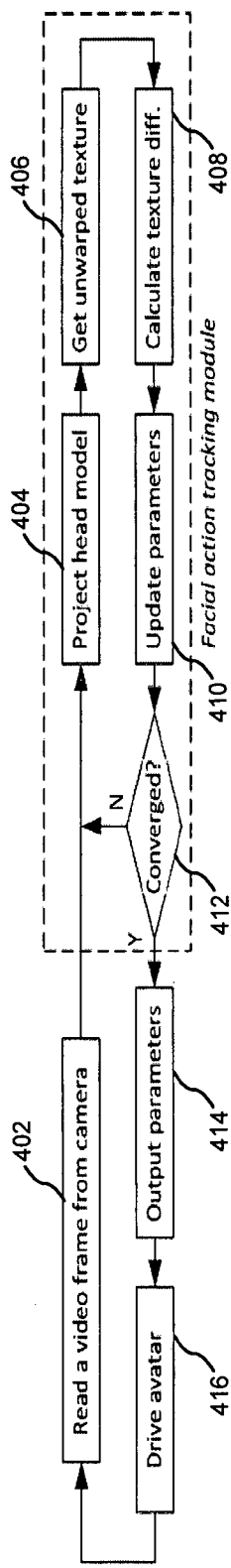

FIG. 4 illustrates an exemplary logic flow 400, which shows exemplary operations of an avatar-based facial animation system. In this diagram, a dashed line encloses operations that may be performed by a face tracking module. Although FIG. 4 shows particular sequences, other sequences may be employed. Moreover, the depicted operations may be performed in various parallel and/or sequential combinations.

As shown in FIG. 4, a video frame is read at a block 402. In embodiments, this video frame may be read from a camera placed in front of a user. From this, the face tracking module analyzes the face area, and calculates the animation parameters according to the facial image. As shown in FIG. 4, this may involve the performance of blocks 404-412.

The animation parameters may include the pitch and yaw of the head, the mouth opening and closing, the eyebrow raising and squeezing. In embodiments, all of these parameters are analyzed through the face tracking module.

FIG. 4 shows that, at a block 414, the animation parameters are sent to a rendering engine. In turn, the rendering engine drives an avatar 3D model based on the animation parameters at a block 416.

As indicated in FIG. 4, the operations of blocks 402-416 may be performed repeatedly. For instance, these operations may be performed for each frame in a video stream As described above, the face tracking module may perform blocks 404-412, which provide an iterative procedure.

In these blocks, a head model is projected onto a face area detected within the video frame that was read at block 402. More particularly, embodiments may employ a parameterized 3D head model to help the facial action tracking. The shape (e.g., the wireframe) of the 3D model is fully controlled by a set of parameters. In projecting the 3D model onto the face area of the input image, its parameters are adjusted so that the wireframe changes its shape and matches the user head position and facial expression.

For instance, FIG. 4 shows that, at block 404, the head model is projected onto the detected face (also referred to as the current face). This yields an un-warped texture of the current face at a block 406. At a block 408, this un-warped texture is compared with the template texture. Based on this calculation, one or more parameters of the 3D head model may be updated at a block 410. As indicated by a block 412, blocks 404-410 may be repeated if the 3D head model and the current face have not converged within a predetermined amount. Otherwise, operation may proceed to a block 414.

At block 414, parameters are provided. These parameters may be in the form of facial features (also referred to as input face features). In embodiments, sequences of such features may be used to drive an avatar at a block 416.

Thus, the control parameters of the 3D head model may be repeatedly updated until a satisfactory convergence with the current face occurs. This procedure can be regarded as an image alignment problem that is subject to a certain set of transformation parameters. Thus, the operations of blocks 404-412 may involve an inverse compositional algorithm, such as one described in Baker, S. and Matthews, I., *Lucas-Kanade 20 years on: A Unifying Framework*, International Journal of Computer Vision, 56(3): 221-255, 2004. Such an algorithm may advantageously speed up the image alignment in an actual implementation.

For a 3D head model, embodiments may use the classical Candide3 wireframe as the parameterized head model inside a face tracking module. This is because the Candide3 wireframe model contains small number of vertices but still provides a rich set of animation structure. However, embodiments may employ other models.

Figure 5:
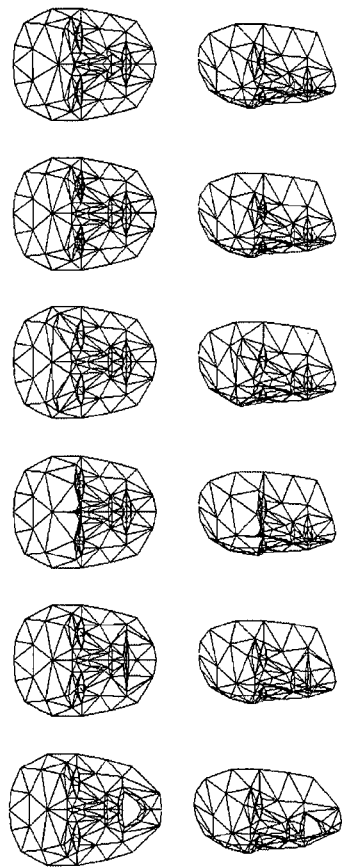
FIG. 5 are views of exemplary wireframe models.

In order to keep compact animation parameters, six typical action units (AUs) may be selected from the model's animation structure, as shown in FIG. 5. In particular, FIG. 5 provides views of the Candide3 wireframe model and its selected facial action units. As indicated in these views, most major movements due to facial expression are covered by these six AUs.

Figure 6:
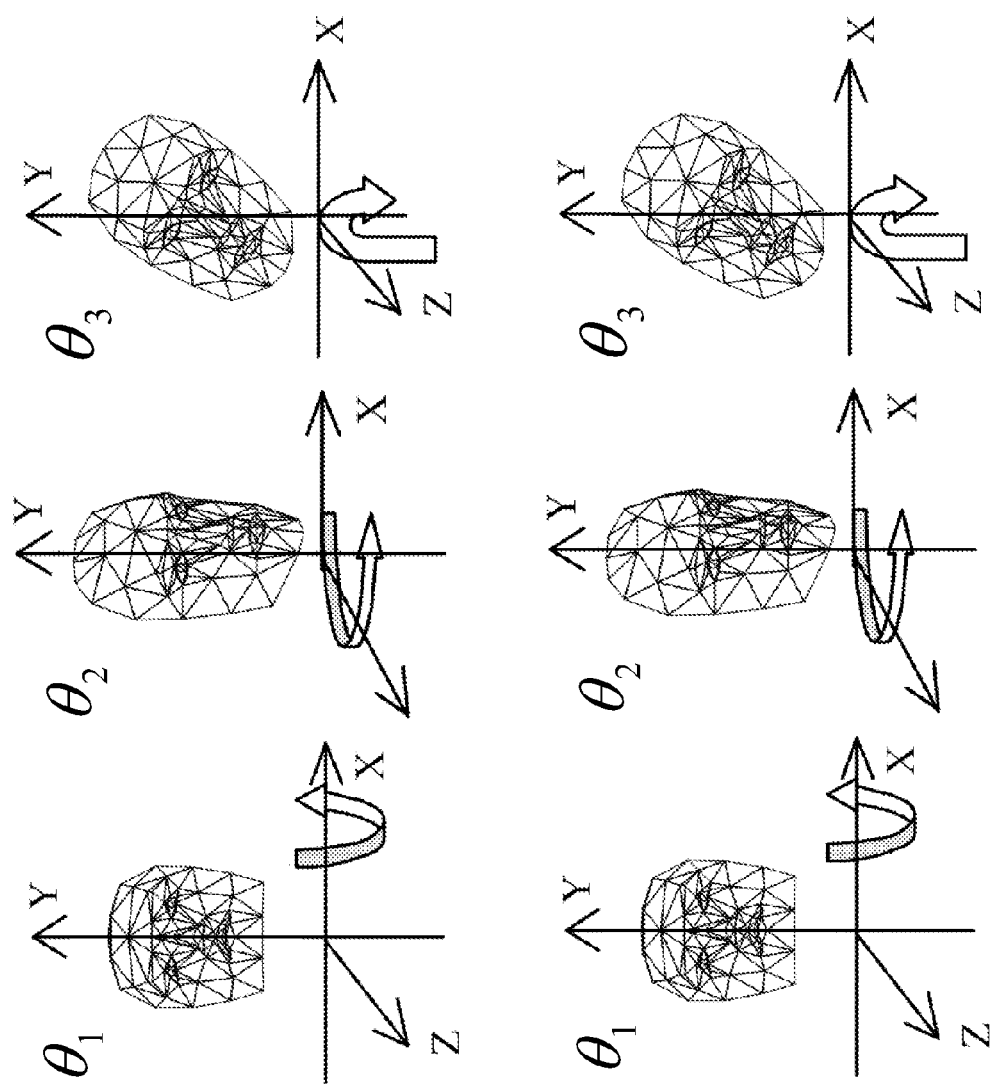
FIG. 6 are views of exemplary model under translation, rotation, and scaling.

Except for local elastic transformation, the head model still needs to be subjected to global rigid movement, as shown in FIG. 6. In particular, FIG. 6 illustrates a Candide3 head model under translation, rotation, and scaling factors. This global rigid movement involves 3-axis rotation, as well as x- and y-axis translation. The 3-axis rotation corresponds to the pitch, yaw and roll of the head. The x, y-axis translation corresponds to the head movement parallel to the image plane. In embodiments, parallel projection may be used instead of perspective projection. In such cases, the z-axis translation results a scale factor. Therefore there may be six rigid parameters describing global transformation, and six non-rigid parameters describing facial action units. As a result, a set of twelve parameters may be used to describe all facial variations in an avatar implementation.

With the aforementioned compact description of animation parameters, along with the inverse compositional image mentioned described above, a face tracking module may be implemented such that it can run in real time on various processors (such as on an Intel Atom 1.6 GHz processor). As a result, avatar-based applications may execute smoothly on Atom-based embedded devices, such as mobile phones and set-top boxes.

As described above, embodiments may obtain features from a database based on a user's face. Embodiments may provide a fast and reliable approach that retrieves an expression sequence from a database having the most similar facial features.

As described herein, each frame of the facial expression data includes multiple (e.g., nine) facial features that were previously extracted. An example sequence of such features is illustrated in FIG. 7. In particular, FIG. 7 shows two examples of face feature sequences. For instance, each row in FIG. 7 represents a face feature that was extracted from a frame in the database. Although not shown several (e.g., nine) values exist in each row at multiple columns. For example, the first column represents the mouth open size. FIG. 7 includes two sequences: a sequence (a) represents a mouth open expression, and a sequence (b) representing a mouth close procedure.

As described above, a face tracking module may generate output parameters. For example, in FIG. 4, such output parameters may be in the form of a sequence of input face features, which are provided at block 414. An example of such input face features are shown in FIG. 8. In particular, FIG. 8 shows a sequence of input face features based derived from a mouth open expression of a detected face.

Ideally, these features would result in the retrieval of sequence (a) in FIG. 7, because both sequences correspond to mouth open expressions. However, convention approaches may result in sequence (b) of FIG. 7 being retrieved. This is because traditional nearest searching algorithms, such as ones employing the well-known KD-tree structures) can only process a separate query. In other words, such traditional algorithms cannot deal with a time series. For example, when using a single query technique, line (2) of FIG. 8 would likely cause retrieval from the database, of frame (8) in sequence (b) of FIG. 7. However, in actuality, frame (4) in sequence (a) of FIG. 7 is a more appropriate match.

To deal with the problem, embodiments introduce another feature: facial change trend. For each frame of a face feature sequence, a facial change trend feature is defined for each of the multiple (e.g., nine) features. For example, frame (4) of sequence (a) in FIG. 7 is in a mouth open procedure. This may be evaluated from near frames. For instance, from frame (1) to frame (4), a mouth open change of 18.68−16.56=2.12 occurs. Also, from frame (4) to frame (7) a mouth open change of 21.084−18.68=2.44 occurs.

Such absolute change values may then be discretized into some labels (e.g., integers). Exemplary labels include (but are not limited to) +2 (positive change largely), +1 (positive change normally), 0 (almost no change), −1 (negative change normally), −2 (negative change largely). As examples, "+2" may be assigned to frame (4) of sequence (a) in FIG. 7. Similarly "−2" may be assigned to frame (8) of sequence (b) in FIG. 5.

Likewise, when retrieving an input face feature sequence, such labels may be assigned. For instance, a "−2" may be assigned to frame (2) of FIG. 8. Thus, embodiments may compare the expression change trend assignments of the query and the output results. By doing this, a correct retrieval result is achieved (frame (4) of sequence (a) in FIG. 7). This is because it contains a matching change trend label "+2" (the same as the query).

Thus, embodiments may apply the above facial change trend labels to each of the multiple (e.g., nine) features in each frame of the database. Upon obtaining input facial features (which is employed as a database query), a technology, such as KD-tree, may be employed to generate a few candidates (e.g., in FIG. 7, frame (4) of sequence (a) and frame (8) of sequence (b)). Then, embodiments may compare the labels of each candidate with the query's labels. Finally a candidate is chosen that best matches the labels as output results (e.g., frame (4) of sequence (a) in FIG. 7). By this approach, much better results can be achieved than those that do not use labels.

This label approach may advantageously outperform other approaches that do not use facial change trends features. Further, this label approach is very efficient, adding little additional computing requirements (e.g., time) for a query. Moreover, all the labels of the database frames can be computed offline, and only once.

To label the change trend of a particular frame, the difference of each feature is determined for N frames before the frame, and M frames after the frame. In embodiments, N and M can be same (e.g., five). However, M and N can be different. Thus, implementations are not limited to particular values, or to M and N being the same. Also, in discretizing changes, a change larger than 2.1 can be assigned a "+2", while a change smaller than 0.75 can be assign as a "0". However, embodiments are not limited to these thresholds.

Once a facial expression sequence (e.g., the most similar expression) is retrieved from the database, embodiments map the retrieval facial expression to the avatar face. An example of this procedure is illustrated in FIG. 9.

Figure 9:
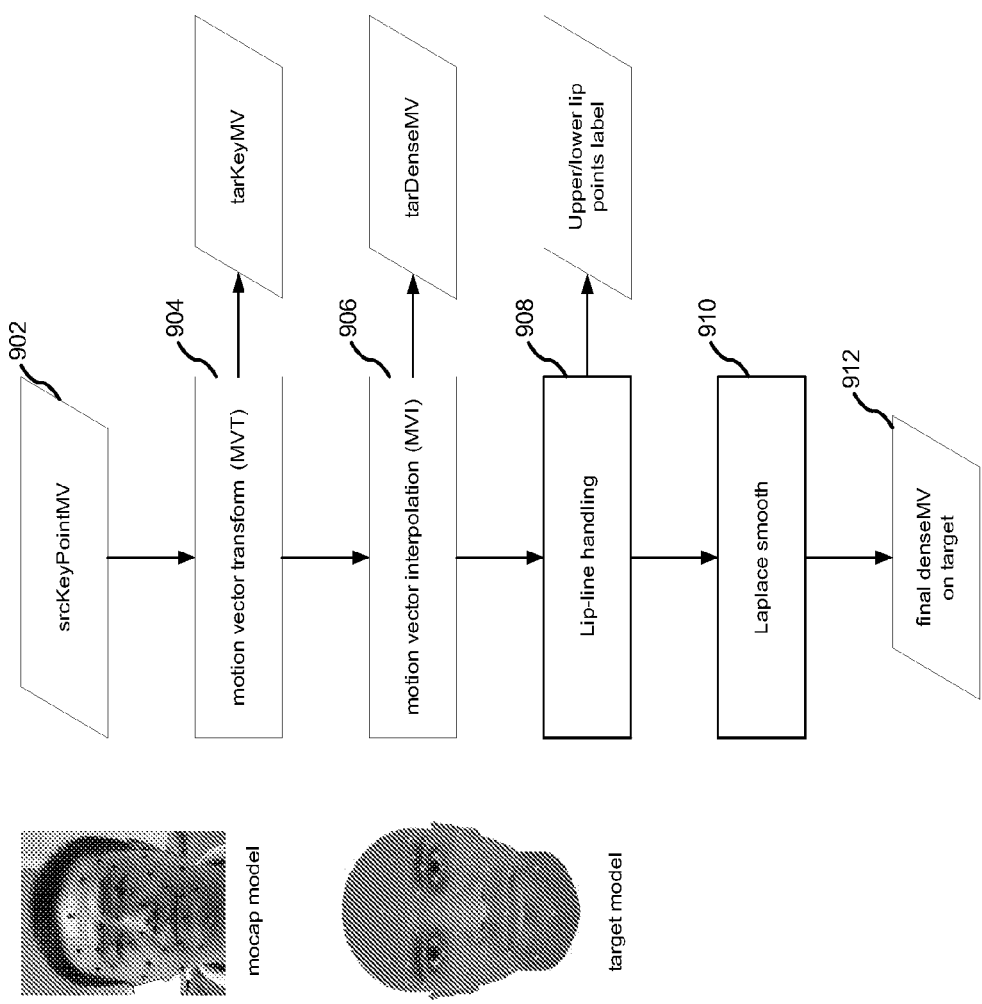
FIG. 9 is a logic flow diagram.

In particular, FIG. 9 is an exemplary logic flow 900, which shows exemplary operations involving the mapping of a retrieved facial expression to an avatar face. In the context of FIG. 1, such operations may be performed by module 110. Embodiments, however, are not limited to this context. Also, although FIG. 9 shows particular sequences, other sequences may be employed. Moreover, the depicted operations may be performed in various parallel and/or sequential combinations.

Inputs for this mapping are: (1) motion vectors (dx, dy, dz) on key-points (e.g., 34 points that are captured from motion capture device); (2) source mocap model (model used in motion capture); (3) target face model (avatar), key-points are known and correspond to mocap model. Outputs are the motion vectors (dx, dy, dz) on each point of target face model (target dense MV).

The objective of this mapping is to transform motion vectors on sparse key-points of a source model to a dense target model (avatar model) and make the target model do the same animation, such as smile, surprise, yawn, etc.

First, at a block 902, the target model is aligned to the source model based on the corresponding key-points (indicated in FIG. 9 as "srcKeyPointMV"). This may be done using a least-square-method.

At a block 904, a motion vector transform (MVT) procedure is performed to transform the source key-point motion vectors to target key-points. In embodiments, this may simply involve only performing scaling operations because the two models are aligned well (e.g., aligned such that rotation and transition are unnecessary). This produces the motion vectors of key-points on target model (indicated in FIG. 9 as "tarKeyMV").

From this, a calculation is performed at a block 906 of the motion vectors on dense points with interpolation on sparse key-points (Motion Vector Interpolation, MVI). These motion vectors are indicated in FIG. 9 as "tarDenseMV". This may involve unwrapping the target model to a cylindrical plane, and deciding which key triangle it locates in for each dense point. The interpolation coefficients may be determined by bary-centric coordinate.

Points in the lip area are specific and may need special additional processing. For instance, a point in an upper lip should only be impacted by points in upper lips area, and cannot be influenced by points in lower lip, even those point which are very close. The converse also applies for lower lips. Thus, lip-line handling is performed at a block 908. This may involve using the well known Dijkstra's algorithm to find the shortest path from left mouth corner to right corner, which is regarded as the lip-line. The lip-line is used to segment upper and lower lip. Through the process, the mouth can open normally.

In order to make the whole face animation smooth, a Laplace smoothing operation is performed on the motion vectors at a block 910. As shown in FIG. 9, this may produce the final motion vectors (indicated as "final DenseMV on target") for the target (or avatar).

This facial animation approach may advantageously provide fast processing speed. For instance, MVT and MVI only need to be compute at a first time. Then, they can be reused in further processing. Also, this approach may advantageously process upper and lower lip areas separately, and use Dijkstra's algorithm to find the shortest path from left mouth corner to right corner on face mesh.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

Some embodiments may be implemented, for example, using a storage medium or article which is machine readable. The storage medium may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software.

As described herein, embodiments may include storage media or machine-readable articles. These may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

While various embodiments of the present invention have been described above, it should be understood that they have been presented by way of example only, and not in limitation.

Accordingly, it will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

The invention claimed is:

1. An apparatus comprising:
a camera to capture a user's facial expressions and head movements;
a face tracking module to track face feature point positions and to decompose the face feature point positions into a facial expression movement and a rigid head movement;
a database module to store a plurality of feature data sequences, each of the feature data sequences corresponding to one of a plurality of facial expression movements;
the face tracking module to retrieve one of the stored feature data sequences based on the captured facial expression movement; and
a mapping module to map the retrieved feature data sequence to an avatar face and to present a similar facial expression movement and a rigid head movement on the avatar face, the facial expression movement being mapped by determining motion vectors for each face feature point position, transforming the motion vectors to avatar face motion vectors on a model avatar face, and smoothing the avatar face motion vectors, the rigid head movement being manned by applying three-axis rotation to the avatar face.

2. The apparatus of claim 1, wherein the plurality of feature data sequences include data for multiple features over a plurality of frames.

3. The apparatus of claim 2, wherein the database module is to further store trend data for each of the multiple features.

4. The apparatus of claim 3, wherein the face tracking module is to retrieve one of the feature data sequences based on trend data corresponding to the user facial feature data.

5. The apparatus of claim 1, wherein the tracking module is to determine the user facial feature data based on predetermined facial wireframe models.

6. The apparatus of claim 1, wherein the mapping module is to map x and v translations of the rigid head movement to the avatar face.

7. The apparatus of claim 1, wherein the mapping module is to determine a lip line for the avatar by finding a shortest path from a left mouth corner to a right mouth corner for each lip segmented from the other lip.

8. A method comprising:
capturing a user's facial expressions and head movements;
tracking face feature point positions of the facial expressions and head movements;
decomposing the face feature point positions into a facial expression movement and a rigid head movement;
retrieving one of a plurality of stored feature data sequences using the facial expression movement, each of the feature data sequences corresponding to one of a plurality of facial expression movements; and
mapping the retrieved feature data sequence to an avatar face and presenting a similar facial expression movement and a rigid head movement on the avatar face, the facial expression movement being mapped by determining motion vectors for each face feature point position, transforming the motion vectors to avatar face motion vectors on a model avatar face, and smoothing the avatar face motion vectors, the rigid head movement being mapped by applying three-axis rotation to the avatar face.

9. The method of claim 8 wherein the plurality of feature data sequences include data for multiple features over a plurality of frames.

10. The method of claim 9, further comprising storing trend data for each of the multiple features.

11. The method of claim 8, wherein said retrieving is based on trend data corresponding to the user facial feature data.

12. The method of claim 8, further comprising determining the user facial feature data based on predetermined facial wireframe models.

13. The method of claim 8, further comprising mapping x and y translations of the rigid head movement to the avatar face.

14. The method of claim 13, wherein said mapping comprises determining a lip line for the avatar by finding a shortest path from a left mouth corner to a right mouth corner for each lip segmented from the other lip.

15. An article comprising a non-transitory machine-accessible medium having stored thereon instructions that, when executed by a machine, cause the machine to perform operations comprising:
capturing a user's facial expressions and head movements;
tracking face feature point positions of the facial expressions and head movements;
decomposing the face feature point positions into a facial expression movement and a rigid head movement;
retrieving one of a plurality of stored feature data sequences using the facial expression movement, each of the feature data sequences corresponding to one of a plurality of facial expression movements; and
mapping the retrieved feature data sequence to an avatar face and presenting a similar facial expression movement and a rigid head movement on the avatar face, the facial expression movement being mapped by determining motion vectors for each face feature point position, transforming the motion vectors to avatar face motion vectors on a model avatar face, and smoothing the avatar face motion vectors, the rigid head movement being mapped by applying three-axis rotation to the avatar face.

16. The article of claim 15, wherein the instructions, when executed by a machine, further cause the machine to:
map x and y translation of the rigid head movement to the avatar face.

17. The apparatus of claim 1, further comprising a rendering engine to drive the avatar using the mapped feature data sequence.

18. The apparatus of claim 17, further comprising a communications interface to communicate the mapped feature data sequence to a second device, the second device having the rendering engine.

19. The method of claim 8, further comprising communicating the mapped feature data sequence to a second device to render the avatar at the second device.

20. The method of claim 19, further comprising driving the avatar using the mapped feature data sequence.

* * * * *